Dec. 15, 1931.  J. G. BAILEY  1,837,143
CULTIVATOR
Filed Dec. 19, 1929   3 Sheets-Sheet 1
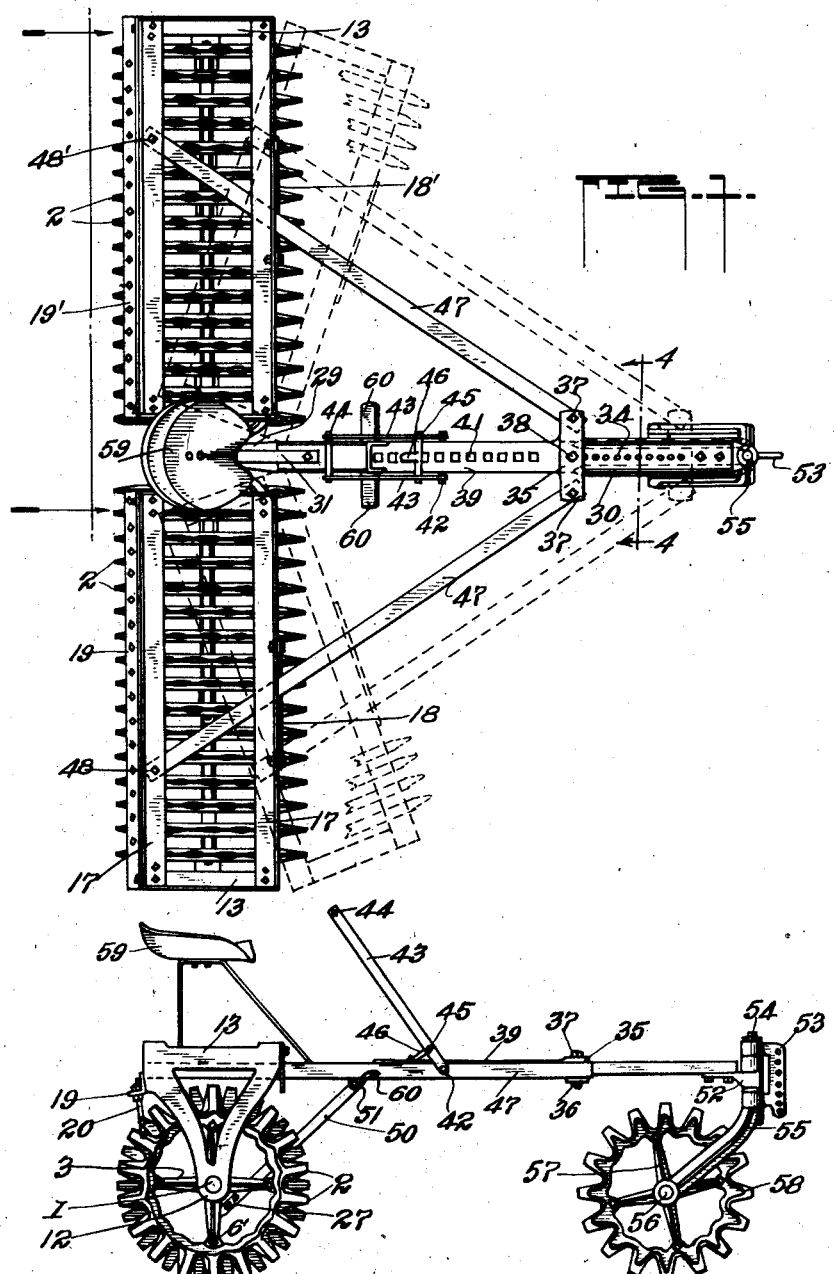

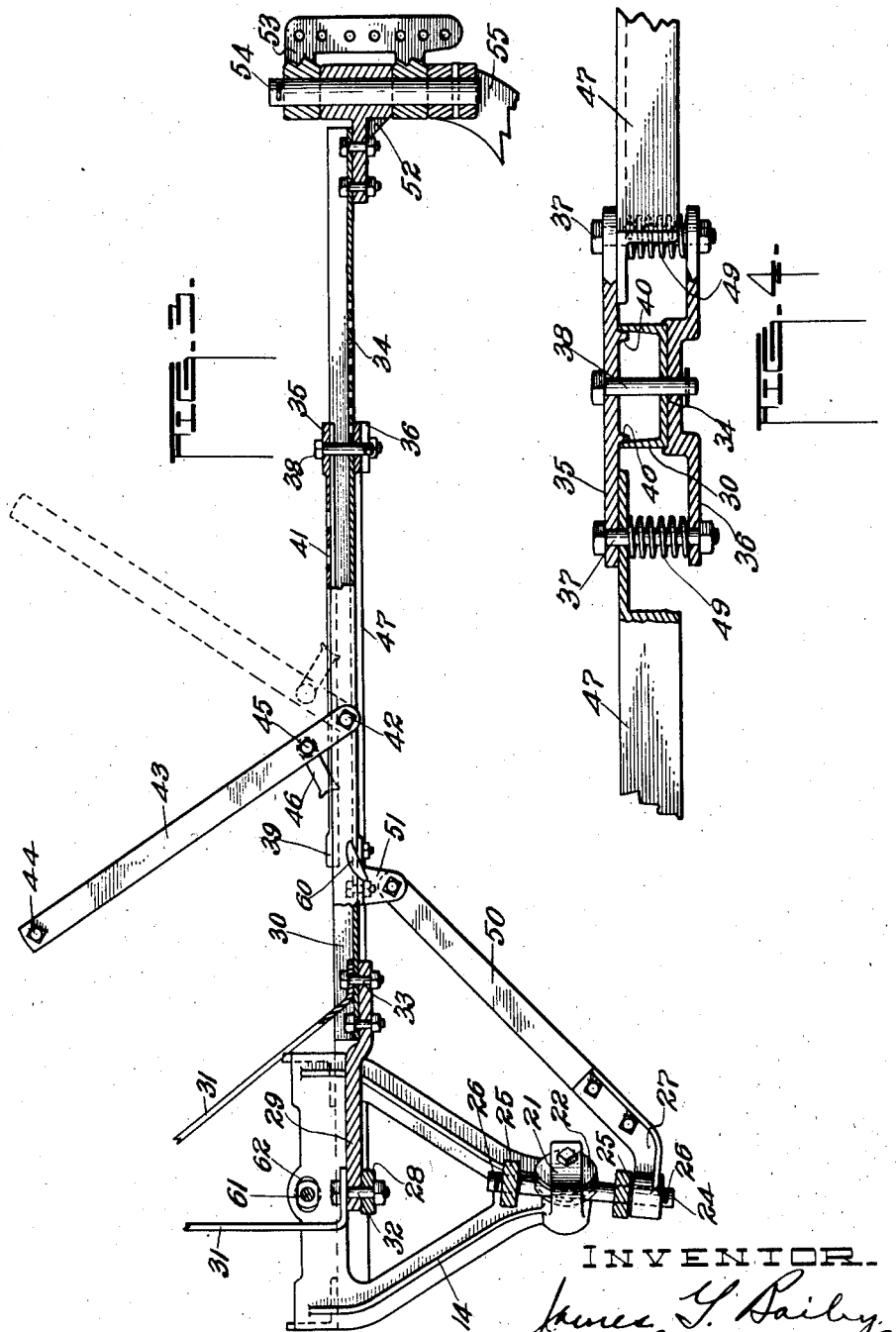

Dec. 15, 1931. J. G. BAILEY 1,837,143
CULTIVATOR
Filed Dec. 19, 1929   3 Sheets-Sheet 3
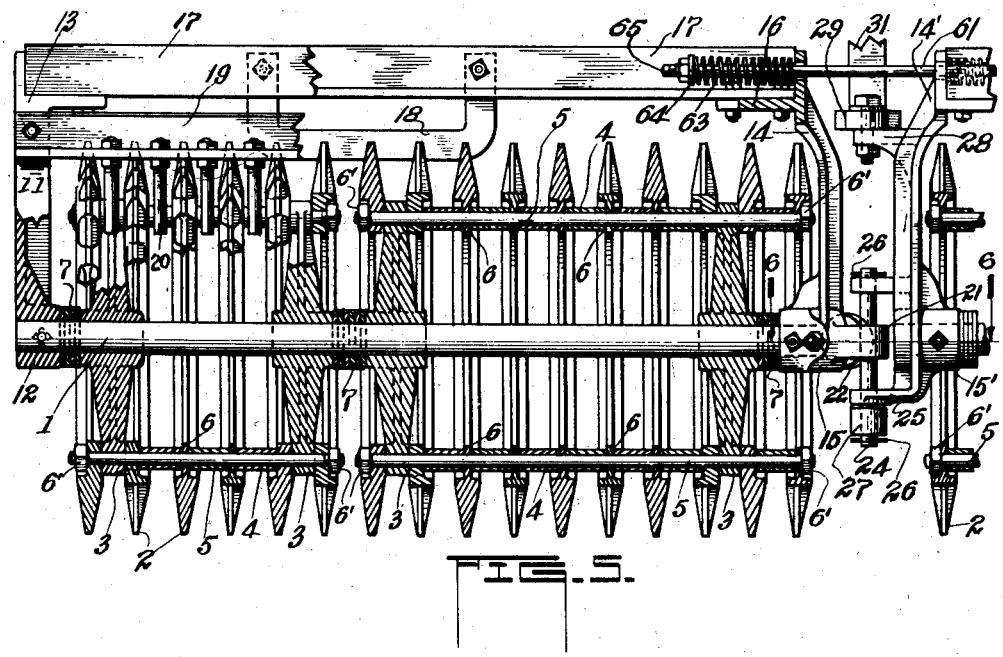
FIG. 5.
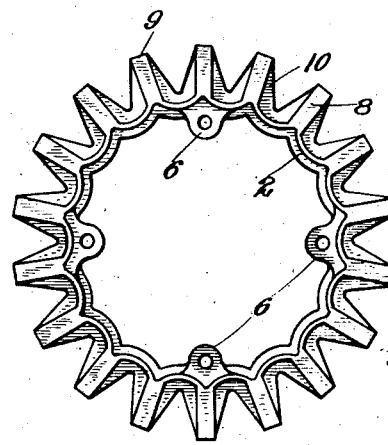
FIG. 7.
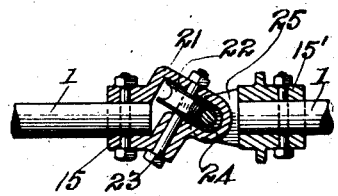
FIG. 6.
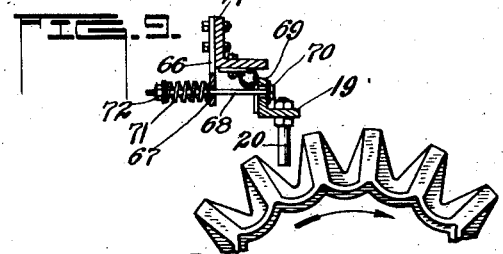
FIG. 9.
FIG. 8.
INVENTOR.
James G. Bailey
LaPorte & LaPorte
ATT'YS Patented Dec. 15, 1931

1,837,143

UNITED STATES PATENT OFFICE

JAMES G. BAILEY, OF DELEVAN, ILLINOIS, ASSIGNOR TO A-C MANUFACTURING CO., OF PONTIAC, ILLINOIS, A CORPORATION OF ILLINOIS

CULTIVATOR

Application filed December 19, 1929. Serial No. 415,151.

This invention has reference to an agricultural implement adapted as a cultivator for preparing the soil, such as pulverizing the surface ground and clods and breaking up and mulching ground crust generally preparatory to seeding; however, the use of the cultivator is further extended to cultivating seeded ground and young crops for eliminating the presence of weeds and other extraneous growth.

The principal object of the invention is the provision of a cultivator comprising an adjustable frame mounted on roller units, said units consisting of a swiveled forward roller mounting adapted for draw-bar connection for pulling the cultivator, and a rear roller mounting including coupled roller sections, and adjustable means on said frame for adjustably canting or diverging the rear roller sections to effect a scarifying action of the sections on the soil.

The invention has for a further object to provide the forward and rear units of the cultivator with toothed ring-like members having their peripheries cut and shaped to form wedge shaped cutters whereby to facilitate the cutting and entrance of the members into the ground during their travel over the same.

A further object of the invention consists of a cultivator of the type herein referred to having the forward swivel mounting comprising one or more toothed ring-like members whereby to effect cultivation and action upon the soil traversed by such mounting, being that portion of soil not traversed by the rear roller mounting due to the sections thereof being coupled medially of the cultivator and the lack of toothed ring-like members in the mounting at that point, thereby effecting a thorough cultivation of the soil by the implement throughout the width thereof.

The invention has for a still further object to provide a flexible coupling for the rear roller mounting of the cultivator comprising the rear roller sections whereby to permit independent adjustment of the coupled sections to rolling and uneven ground during the travel of the cultivator over the soil.

A still further object of the invention consists in the provision of cleaner bars for each of the toothed ring-like members of the rear roller sections, whereby to maintain the members free of clogged dirt, weeds and other adhering matter.

The invention further comprehends the provision by each of the rear roller sections of the cultivator of separate groupings of aligned ring-like members, each grouping preferably secured together and independently free of the other for rotation, whereby to facilitate the turning around or changing in course of the cultivator in the field, permitting the outer grouping of ring-like members of the sections to accommodate themselves to the longer path of travel in such movements.

Other and additional objects will more fully appear from the following description.

That the invention may be more fully understood, reference is had to the accompanying drawings forming a part of the present description and illustrating a preferred embodiment of the invention, in which:—

Fig. 1 is a top plan view of my improved cultivator and showing in dotted lines the extreme canted position of the rear coupled sections.

Fig. 2 is a side elevation of Fig. 1, however, omitting the dotted line position of the rear sections.

Fig. 3 is a detail view, partly in section, of the adjusting mechanism for the rear sections of the cultivator, including associated frame work.

Fig. 4 is a sectional detail of certain of the adjusting mechanism and frame work shown in Fig. 3, as the same would appear if taken on the line 4—4, Fig. 1;

Fig. 5 is an enlarged detail rear view, partly in section, of one of the coupled rear roller sections of my improved cultivator.

Fig. 6 is a sectional detail of the flexible coupling as the same would appear if taken on the line 6—6, Fig. 5.

Fig. 7 is a side view in elevation showing in detail the construction of the toothed ring-like members employed in the forward and rear mountings of the cultivator;

Fig. 8 is a view of that portion of the frame of the rear sections showing a guide member for guiding and confining the movement of an adjustable frame member shown in dotted lines; and Fig. 9 is a detail partly in section showing a modification in the construction of the cleaner bars support.

Like characters of reference denote corresponding parts throughout the figures.

Main roller sections

Since there are two main roller sections which are duplicates of each other and which are swiveled together at their inner ends, the description of one will suffice for both, except as to the manner and means of coupling them together and the frame, which will be described later.

A roller in its entirety comprises a non-rotative shaft 1; non-rotative since the opposite ends of the shaft are fixedly connected in frame bearings. Loosely rotatable on said shaft are preferably sets of ring-like toothed members 2. The inner set of such members are of a greater number than the outer set and this division as to the number of members in each set may be as expediency may require or dictate. The purpose of these two sets of members is to allow the outside set to rotate freely of the inner set and to accommodate the roller in its sweep as the machine is caused to turn corners of a field, and since the sweep of the roller at its outer end is greater than its inner end, the outside rollers are thereby allowed to rotate faster when the machine is making a turn.

Pairs of spiders 3 loosely carried on the shaft 1 provide a connection for the shaft and the members, said members, as shown, being arranged in suitable spaced relation, the spiders providing spacers between sets of members and tubular collars 4 providing spacers between other and adjacent members. Rods 5 are employed which pass through the spiders, the collars 4 and ears 6 of the members, to connect the spiders, the members and the collars in the assembled relation shown, nuts 6' being threaded on the ends of the rods to secure the elements described in such assembled relation. Spacer or thrust rings or washers 7 are employed positioned on the shaft 1 between adjacent spiders of the inner and outer sets of members and similar spacer or thrust rings or washers 7 are employed on the inner and outer ends of the shaft 1 between spiders and bearings of the frame to which the shaft is secured.

The ring-like members 2 are all made of the same pattern and include peripheral portions which are tooth-like in formation, as indicated at 8 and each tooth is wedge shaped, the slopping or inclined faces of which are laterally of the members which presents the wedge shaped teeth with cutting or penetrating portions 9 and the said teeth are connected by circumferential webs 10 which are V shaped and with the apexes of the webs extending inwardly toward the base of the members whereby to provide free cutting portions of the teeth therebetween.

Main roller frames

The outer ends of the shafts 1, 1 are each secured in castings 11. These castings have bearing portions 12 to receive the ends of the the shafts 1, 1 and are then flared upwardly and outwardly to provide angular head portions 13. At the inner end of one roller there is provided a casting 14 somewhat similar to a casting 11 which is provided with a bearing portion 15 to which the inner end of the shaft 1 is secured, and said casting is also provided with an angular head portion 16. The head portions of the castings 11 and 14 are connected by preferably spaced angle bars 17 which provide bracing means for the frame and further provide rests or supports for weights in the event it is desirable to have such a means to apply a pressure on the members to cause deeper penetration in the ground. To the front angle iron 17 a guide strap 18 is connected for a purpose to be described and 19 designates an angle bar connected at its opposite ends to the castings 11 and 14, respectively, to which are adjustably secured and from which depend, cleaner bars 20, one each located between adjacent ring-like members. At the inner end of the other roller is a casting 14', which is similar in some respects to the companion casting 14 and said casting 14' is provided with a bearing 15' to which the inner end of the shaft 1 is secured. The upper portion of the casting 14' is constructed somewhat similar to the casting 14 and the said casting 14' is connected to the casting for the outer end of this roller in a manner and by means substantially similar to that described for the preceding roller. Also there is provided a guide strap 18' for purposes to be described and, furthermore, there is an angle bar 19' to which are connected and from which depend cleaner bars like those previously described and which function in a similar manner. This structure is best seen in Figures 1, 2 and 5; it being understood, that both of the main rollers, their supports, connections and other elements described, are substantially alike and duplicates of each other, with exceptions as will be pointed out in connection with the castings 14 and 14'.

The bearing 15 with the casting 14 is provided with an inwardly extended yoke 21, best seen in Fig. 6, wherein the yoke portion proper of the bearing is at an angle to the axis of the shaft 1. In the yoke rotates a shive-like wheel 22 and said wheel is carried on a short shaft or spindle 23. Through the yoke 21 a rod 24 is adapted to have movement, riding against the concave surface of the shive-like wheel 22, and in like manner the said wheel may have a rolling movement on said rod, the movement of the rod or roller being dependent on an up and down movement of either of the respective rollers depending of the surface contour of the ground over which the rollers may travel. The rod 24 is carried through and supported in a yoke or bifurcated structure 25 provided on the casting 14', see Fig. 5. The rod is held by cotter pins 26 at its upper and lower ends and between the lower cotter pin and the yoke or bifurcated structure there is connected to the rod 24 a coupling 27 for purposes to be described. The rod 24, as will be seen in Fig. 3, is slightly canted to the vertical for a purpose to be explained and to this end the yoke or bifurcated structure 25 is of like arrangement for the canted position of the said rod 24. The said casting 14' at a suitable point below its head portion is provided with an off-set bracket 28 and said bracket provides a connection for frame parts and a seat support to be described.

Due to the character of the swiveled connection between the two main rollers which will permit vertical movement at their inner ends in relation to each other, there is a slight tendency when these rollers are canted for them to want to ride upwardly at their inner ends and to prevent this, although not eliminating the possibility of such action due to undulated ground when such movement is desirable, I provide a yielding connection between the head portions of the castings 14, 14', see Fig. 5, which while permitting movement of the castings in relation to each other will normally yieldingly hold the castings and the inner ends of the rollers in their proper normal relation in respect of ground engaging contact. The connection referred to comprises a rod 61 which passes through the spaced upstanding portions of the head portions of said castings 14 and 14', openings 62 being provided for the passage of the rod through these heads and which said openings are of sufficient size and design to permit canting of the rollers and their frames and up and down movement of said rollers at their inner ends without cramping and without bending said rod. Coiled springs 63 are carried on the opposite outer ends of said rod and bear respectively against the upstanding portions of the head portions of the castings 14 and 14' and also against collars 64 retained in adjusted positions by means of nuts 65 having a threaded engagement with the ends of the rods 61.

In Fig. 9 I have shown a modified supporting structure for the cleaner bars 20. This structure provides for hinging the angle bar 19 to the rear angle bar 17 to permit it to have upward movement in the event, when the rollers are moving forward obstructions such as small stones or rocks get caught in between the ring-like members and will not give to the interference of the cleaner bars, these bars may swing upwardly and permit the clearance of such obstructions and thereby prevent breakage of parts of the machine. The angle bar 19 is connected to have yielding movement and under the influence of springs will be caused to return to their operative position, and I, therefore, provide plates 66 which depend from the rear angle bar 17 which have slotted openings 67 through which project rods 68 which also project through slotted openings 69 in the angle bar 19 and on the front end of these rods are secured nuts 70 while on their rear ends coiled springs 71 are carried which at their front ends bear against plates 66 and at their rear ends are held by adjusting nuts 72 threaded on said rods 68. In this manner when the bar 19 and the cleaner bars 20 are moved upward, the springs 71 are compressed and act to return the cleaner bars to their operative positions when obstructions such as are referred to are cleared.

*Draw bar frame*

Connected to the bracket 28 is a bar 29 which extends forward between the castings 14 and 14'. Secured to the forward end of this bar is a channel bar 30 with the channel portion of the bar preferably opening upwardly. A seat support 31 includes members which are connected respectively to the bar 29 by means 32 which secures the said bar to the bracket 28, and to the channel bar 30 by means 33 which secures the inner end of the channel bar to the forward end of the bar 29. The said channel bar in its forward portion is provided with a plurality of vertically disposed spaced openings 34. Movable longitudinally along the forward portion of the channel bar is across head which comprises the upper and lower straps 35 and 36 which are connected at their opposite outer ends by bolts 37 which clamp the head to the channel bar and yet permit the said head to have longitudinal movement along the bar. The position of the head on the channel bar is determined by the removable bolt 38 which passes through the head and any one of the openings 34 in the channel bar. Extending rearwardly from the strap 35 and overlying the channel bar 30 is a bar 39 which is provided with underlying ribs 40 acting as guides for the movement of the bar 39 and the strap 35 longitudinally of the channel bar. The bar 39 is provided throughout its length with a plurality of spaced openings 41. Pivoted at 42 to the channel bar 30 and extending upwardly are a pair of corresponding lever bars 43 connected at their upper ends at 44 and pivoted at 45 between said lever bars is a double ended pawl 46 adapted to enter the openings 41 in the bar 39. The lever may be swung into different positions as shown in full and dotted lines in Fig. 3 and by an oscillatory movement of the lever, impart a ratchet-like movement to move the bar 39 and the cross head along the channel bar, after first having removed the pin 38. With connections between the cross head and the frames of the rollers, the said rollers may be canted with respect to each other, at whatever angle may be desired, as shown in full and dotted line positions in Fig. 1. To accomplish this, reach bars 47 are provided which have a pivotal connection with opposite ends of the cross head as shown in Fig. 4 and passing through the guide straps 18 and 18' are connected at 48 and 48' thereto as shown in Fig. 1. The said reach bars 47 at their forward ends have a pivotal connection with the bolts 37 in the cross head and between the said reach bars and the strap 36 there are provided on the bolts 37 coiled springs 49. These coiled springs yieldingly hold the forward ends of the reach bars normally in the assembled relation with the cross head in the manner shown in Fig. 4 and permit a weaving of the forward ends of the reach bars on the cross head which results from movement of the roller sections over uneven ground and adapt the forward ends of the reach bars thereto. In addition to the direct connection between the channel bar 30 and the bracket 28 of the casting 14' there is an additional connection in the provision of a reach bar 50 between the coupling 27, previously referred to, and a bracket 51 secured to the underneath side of the channel bar 30, as shown in Fig. 3. Thus it will be observed that the draft connection to the two rollers is through the reach bar 30, the casting 14' and the rod 24 to which reference has been previously made. The connection as shown, wherein the rod 24 is canted slightly to the vertical is for the purpose of the pull having a tendency to force the ring-like members of the rollers into the ground as the machine is moved forwardly.

*Draft connection and auxiliary roller*

Connected to and extending forwardly of the channel bar 30 is a coupling bracket 52 on which is swiveled a coupling yoke 53 accomplished by means of a removable coupling pin 54. Any suitable draft connections may be made with the yoke 53. Coupled to the lower end of the pin 54 to have a swinging movement therewith, is a casting 55 bifurcated in form for the reception at its lower end of a spindle 56 journaled therein and rotatable on said spindle are one or more spiders 57 of a structure corresponding to those previously indicated at 3 to which are connected for rotation one or more ring-like members 58 corresponding in structure to the ring-like members 2, but preferably smaller in diameter. These ring-like members 58 constitute a forward roller structure for the draft bar connections and function in every respect like the main rollers and are aligned with respect to the main rollers so as to traverse the ground and act upon the soil in a path of travel between the two said main rollers not acted upon by such rollers and, therefore, such three rollers are a completement for the structure acting on the ground covered by the width of the machine and thus the ground is effectively treated by such three rollers. A seat 59 is secured to the support 31 and foot rests 60 are provided secured to and projecting oppositively from the channel bar 30.

It is to be noted that the weight of the person handling the machine is at the inner end of one roller and that the draft connections are also made to this roller with reach bar connections between said draft connection and the two said main rollers and so made as to permit of canting of the two main rollers with respect to each other in the manner described, and it is to be noted that while the inner ends of the two rollers may have vertical movement with respect to each other in the connections described, such connections which include the rod 24 are of such a character that the pull is tending downwardly and thus vertical movement of the inner ends of the rollers occurs, not under normal pulling conditions but only at a time when the rollers are moving over uneven ground when such movement is naturally of advantage. In other words, considerable flexibility is present when such flexibility is of advantage. Expressing this in another way, when the rollers are in axial alignment and the machine is being pulled forward there is little or no tendency for either of the rollers to have a tendency of upward movement on the pin 24, but when the rollers are canted, there would be a tendency for the rollers, due to their cant, to move at an angle rather than straight ahead, with the possible result of one or the other of the rollers riding upwardly at their inner ends, either by movement of the pin 24 or roller 22, which tendency is retarded if not entirely prevented, except due to undulated ground by the pin 24 being inclined, with its upper end forward of its lower end, which directs the forward pull in a more or less forward downward direction.

What I claim is:

1. In an implement of the character described, in combination, a pair of roller sections, each section including a non-rotative shaft and two sets of a series of ring-like ground engaging elements freely rotative on said shafts, means providing a swivel connection between the inner ends of said shafts whereby the said rollers may be adjusted in angular relation to each other and the said connection permitting free up and down movement of the inner ends of either of said shafts, a draft connection with the inner ends of said rollers, and an adjustable connection between said rollers and said draft connection whereby the said rollers may be adjustably canted in their relation to each other.

2. In an implement of the character described, in combination, a pair of roller sections, each section including a non-rotative shaft and two sets of a series of ring-like ground engaging elements freely rotative on said shafts, means connecting the ring-like elements of each set in series whereby the elements of each set may rotate in unison and each set of elements rotate independently of the other set, means providing a swivel connection between the inner ends of said shafts whereby the said rollers may be adjusted in angular relation to each other and the said connection permitting free up and down movement of the inner ends of either of said shafts, a draft connection with the inner ends of said rollers, and an adjustable connection between said rollers and said draft connection whereby the said rollers may be adjustably canted in their relation to each other.

3. In an implement of the character described, in combination, a pair of roller sections, each section including a non-rotative shaft and two sets of a series of ring-like ground engaging elements freely rotative on said shafts, means connecting the ring-like elements of each set in series whereby the elements of each set may rotate in unison and each set of elements rotate independently of the other set, the elements constituting the outside set of each roller comprising a number of elements less than the number of elements in the inner set, means providing a swivel connection between the inner ends of said shafts whereby the said rollers may be adjusted in angular relation to each other and the said connection permitting free up and down movement of the inner ends of either of said shafts, a draft connection with the inner ends of said rollers, and an adjustable connection between said rollers and said draft connection whereby the said rollers may be adjustably canted in their relation to each other.

4. A roller for an agricultural implement of the character described, including a non-rotative shaft and a series of ring-like ground engaging elements arranged in two sets on said shaft, one set comprising a lesser number of elements than the other set, and means connecting each set of elements whereby the sets of elements may rotate freely as sets on the shaft and independently of each other.

5. A ground engaging element for an implement of the character described, comprising a ring-like member, the ground penetrating elements of which comprise a plurality of spaced wedge-like teeth, the inclined surfaces of which diverge from their cutting edge portions laterally and outwardly to the base of the member and the said teeth connected by circumferential webs V-like in formation to leave free cutting portions at the terminals of said teeth.

6. In an implement of the character described, in combination, a pair of roller sections, each section including a non-rotative shaft and two sets of a series of ring-like ground engaging elements freely rotative on said shafts with the inner ends of said roller sections and said shafts spaced apart, means providing a swivel connection between the spaced inner ends of said shafts whereby the said rollers may be adjusted in angular relation to each other and the said connection permitting free up and down movement of the inner ends of either of said shafts, a draft connection with the inner ends of said rollers, an adjustable connection between said rollers and said draft connection whereby the said rollers may be adjustably canted in their relation to each other, and a support for the outer end of said draft connection comprising a roller of ring-like ground engaging elements having a swivel connection with said draft connection and the said last mentioned elements adapted for action upon the soil in the area non-traversed by said first mentioned rollers by reason of the spaced connection of the inner ends of said rollers.

7. In an implement of the character described, in combination, a pair of roller sectons, each section including a non-rotative shaft and two sets of a series of ring-like ground engaging elements freely rotative on said shafts with the inner ends of said roller sections and said shafts spaced apart, means connecting the ring-like elements of each set in series whereby the elements of each set may rotate in unison and each set of elements rotate independently of the other set, means providing a swivel connection between the spaced inner ends of said shafts whereby the said rollers may be adjusted in angular relation to each other and the said connection permitting free up and down movement of the inner ends of either of said shafts, a draft connection with the inner ends of said rollers, an adjustable connection between said rollers and said draft connection whereby the said rollers may be adjustably canted in their relation to each other, and a support for the outer end of said draft connection comprising a roller of ring-like ground engaging elements having a swivel connection with said draft connection and the said last mentioned elements adapted for action upon the soil in the area non-traversed by said first mentioned rollers by reason of the spaced connection of the inner ends of said rollers.

8. In an implement of the character described, in combination, a pair of spaced frames, a non-rotative shaft secured in each frame, means providing a swivel connection between the inner ends of the said frames whereby said frames may be canted in their relation to each other, a roller for each frame, said rollers comprising sets of spaced ring-like ground engaging elements, means for connecting each set of elements whereby they may rotate in unison and each set rotate independently of each other, means for mounting each set of elements for free rotation on their respective shafts, means in said swivel connection permitting the free up and down movement of the inner end of each frame, cleaner members operative between adjacent ring-like elements, a support on each frame for the cleaner elements of the respective frames, a draft connection with the inner ends of said frames, reach bar connections with the outer ends of said frames and extending toward the forward end of said draft connection and means on said draft connection operatively connected with said reach bars for adjusting the latter whereby to cant the respective frames in their relation to each other.

9. In an implement of the character described, in combination, a pair of spaced frames, a non-rotative shaft secured in each frame, means providing a swivel connection between the inner ends of the said frames whereby said frames may be canted in their relation to each other, a roller for each frame, said rollers comprising sets of spaced ring-like ground engaging elements, means for connecting each set of elements whereby they may rotate in unison and each set rotate independently of each other, means for mounting each set of elements for free rotation on their respective shafts, means in said swivel connection permitting the free up and down movement of the inner end of each frame, cleaner members operative between adjacent ring-like elements, a support on each frame for the cleaner elements of the respective frames, a draft connection with the inner ends of said frames, reach bar connections with the outer ends of said frames and extending toward the forward end of said draft connection, and a support for the outer end of said draft connection comprising a roller of ring-like ground engaging elements having a swivel connection with said draft connection and the said last mentioned elements adapted for action upon the soil in the area non-traversed by said first mentioned rollers by reason of the spaced connection of the inner ends of said frames.

10. In an implement of the character described, in combination, a pair of roller frames, a swivel connection between the inner ends of said frames including a vertically inclined rod connected with one frame and a roller carried by the other frame and having a surface rolling connection with said rod whereby the frames may move up and down independently of each other, and a draft means having a connection at its inner end with one of said frames and also a connection with said rod.

11. In an implement of the character described, in combination, a pair of roller frames, a roller in each frame, a connection between the said frames including means which will permit the said frames to be canted in their relation to each other and also permitting the said frames to have vertical movement at their inner ends independently of each other, and a draft connection with said frames.

12. In an implement of the character described, in combination, a pair of roller frames, a roller in each frame, a connection between the said frames including means which will permit the said frames to be canted in their relation to each other and also permitting the said frames to have vertical movement at their inner ends independently of each other, a draft connection with said frames, and a swiveled support for the front end of said draft connection including rotative soil treating elements.

13. In an implement of the character described, in combination, a pair of roller frames, a roller in each frame, a swivel connection between the inner ends of said frames to permit the canting of said rollers in relation to each other, a draft bar connection with the inner ends of said frames, a cross-head adjustable longitudinally of said bar, reach bar connections between said head and the outer ends of the respective frames, a manually operable means for moving the cross-head longitudinally of the bar and during such movement transfer movement to the outer ends of the roller frames whereby to swing them on their swivel connection in relation to each other, and yieldable means at the connection of the reach bars with the cross-head whereby a yielding movement is permitted in these connections in the event of a weaving action in the implement due to undulations in the ground traversed by the rollers thereof.

14. In an implement of the character described, in combination, a pair of rollers, a frame for each roller, means connecting the inner ends of the frames to permit the rollers to be canted in their relation to each other and to permit their inner ends to have up and down movement with respect to each other, and a connection between the inner ends of the frames including a spring means for yieldingly holding the inner ends of the rollers and frames in normal contactual relation with the ground surface to be treated.

15. A cleaner bar structure for an agricultural implement of the character described, in combination, a frame support, a bar having a hinge connection with said support, cleaner bars connected with said bar, and means including springs permitting the cleaner bars to move out of their normal operative positions when brought into contact with immovable obstructions and for returning the cleaner bars to their operative positions.

In witness whereof, I have hereunto set my hand, this 25th day of November, 1929.

JAMES G. BAILEY.